(12) United States Patent
Ueno et al.

(10) Patent No.: US 6,811,735 B2
(45) Date of Patent: Nov. 2, 2004

(54) METHOD FOR MANUFACTURING AUTOMOBILE INTERIOR ARTICLE

(75) Inventors: Shigehiro Ueno, Aichi-ken (JP); Akiyoshi Nagano, Aichi-ken (JP); Kazumichi Shigeno, Aichi-ken (JP); Kenichi Furuta, Aichi-ken (JP); Tatsuo Yamada, Aichi-ken (JP); Kenji Sugiyama, Aichi-ken (JP)

(73) Assignee: Toyoda Gosei, Aichi-ken (JP)

( * ) Notice: Subject to any disclaimer, the term of this patent is extended or adjusted under 35 U.S.C. 154(b) by 0 days.

(21) Appl. No.: 10/205,208

(22) Filed: Jul. 26, 2002

(65) Prior Publication Data

US 2003/0020202 A1 Jan. 30, 2003

(30) Foreign Application Priority Data

Jul. 27, 2001 (JP) ........................................ 2001-228480
Nov. 12, 2001 (JP) ........................................ 2001-346096
Nov. 27, 2001 (JP) ........................................ 2001-361399

(51) Int. Cl.[7] ............................................. B29C 59/02
(52) U.S. Cl. ........................ 264/293; 264/154; 264/163
(58) Field of Search ................................. 264/154, 163, 264/238, 239, 293, 340

(56) References Cited

U.S. PATENT DOCUMENTS

| | | | | |
|---|---|---|---|---|
| 2,578,719 A | * | 12/1951 | Mayer et al. | 425/589 |
| 4,980,115 A | * | 12/1990 | Hatakeyama et al. | 264/328.7 |
| 5,114,651 A | * | 5/1992 | Warburton | 264/156 |
| 5,149,479 A | * | 9/1992 | Nakajima | 264/163 |

FOREIGN PATENT DOCUMENTS

| | | |
|---|---|---|
| JP | 3-254919 A | 11/1991 |
| JP | 2000-159047 A | 4/1999 |

* cited by examiner

Primary Examiner—Robert P. Swiatek
(74) Attorney, Agent, or Firm—Posz & Bethards, PLC (57) ABSTRACT

A method for forming tear lines in the rear side of an automobile interior article having a cover portion being developed from which an airbag inflates. When either an automobile interior article body having an integrally molded surface portion or an automobile interior article surface portion is to be molded, the mold is opened after tear line forming projections are moved forward and backward with the mold closed. Thus, the tear lines can be formed at the molding time without any visible extrusion marks of the tear line forming projections on the front surface side (the design face).

16 Claims, 12 Drawing Sheets

METHOD FOR MANUFACTURING AUTOMOBILE INTERIOR ARTICLE

CROSS-REFERENCE TO RELATED APPLICATION

The present application claims priority to Japanese Patent Applications No. 2001-228480 filed Jul. 27, 2001, No. 2001-346096 filed Nov. 12, 2001, and, No. 2001-361399 filed Nov. 27, 2001, the entirety of each is hereby incorporated into the present application by this reference.

BACKGROUND OF THE INVENTION

The present invention relates to a method for manufacturing by molding an automobile interior article body (or a hard resin body) in which an automobile interior article having a cover portion being developed from which an airbag inflates is integrally molded of a hard resin material.

The invention will be described hereinafter mainly in connection with an instrument panel (hereafter abbreviated to "panel") having a cover portion for an airbag. However, the invention can also be applied to cover portions for airbags for side doors, pillars and front/back seats.

In the so-called "hard panel" (the usual injection-molded panel), the body of which is molded of a hard resin (e.g., PPF), a bag covering member formed at the pop-out port of the passenger's seat airbag is molded in the prior art separately from the panel body. Therefore, a gap or abrupt shift in the surface is easily formed between the bag covering member and the panel body so that restrictions must be placed on the design, increasing the number of assembling steps.

Therefore, there has been proposed (as referred to FIGS. 4 and 5 of Unexamined Published Japanese Patent Application No. 71924/2000) a hard panel which is constructed to comprise: a hard resin body (or a panel body) having an integrally molded cover portion; and a soft resin connector (or an airbag supporting assembly) jointed to the rear side of the cover portion and assembled with an airbag module.

Moreover, the cover portion of the panel or the hard resin body is required to have grooves or notches to be broken, so that the cover may be broken when the airbag is activated.

These grooves or notches are formed by a high-frequency welder or a laser working after the panel body is injection-molded. However, the formations of the grooves or notches are done after the molding so that the number of steps increases. Moreover, it is difficult to control the breaking positions and depths, and costs rise as a result.

Therefore, a technique for forming the broken groove portions (or the notch portions) by stamping a groove forming projection just after the end of injecting has been proposed (in Unexamined Published Japanese Patent Applications No. 268205/1996, No. 254919/1991 et al) in pads for steering wheels (molding of a soft resin material).

In case this technique is applied to a hard panel (or an automobile interior article body) made of a hard resin material, however, it has been found that extrusion marks due to the pushing of the groove forming projection (or the groove forming block) appear on the surface of the molding (design face), a problem which does not occur in the case of soft resin material. It is hypothesized that the pushing pressure is harder for hard resin material to absorb than the soft resin material.

SUMMARY OF THE INVENTION

In view of the foregoing background, the present invention has an object to provide a method for die-molding an automobile interior article body to which a cover portion being developed from which an airbag inflates is integrally molded of a hard resin material and in which no extrusion marks caused by pushing of the tear-line forming projection appear on the surface side.

In order to solve the aforementioned problem, we have keenly pursued promising developments and have found that the problem can be solved if the stamping of the tear lines is done during the time between just after the material filling (or injection) to the end of filling, and to conceive a method for manufacturing the above automobile interior article having the construction as described below.

According to a mode of the invention, there is provided a method for die-molding with a hard resin material an automobile interior article incorporating integrally a cover portion being developed from which an airbag inflates, wherein the cover portion is also molded of a hard resin material integrally with the other portions, and wherein a tear line forming block having continuous or discontinuous tear line forming protrusions corresponding to the tear lines for the cover portion is moved forward at the molding step during the time between just after the start of mold filling to the end of filling to form the tear lines.

While the molding material is being filled, its fluidity is so excellent that extrusion marks therefore hardly appear at all in the design surface.

This effect is attained more reliably if the forward movement of the tear line forming block is done in one half of the time taken for filling of the molding material.

It is usual that the forward movement of the tear line forming block is done in $\frac{1}{10}$ to $\frac{1}{2}$ of the mold filling time.

Alternatively, at the time of the forward movement of the tear line forming block, the temperature of the mold at its face forming the outer side of the molding, opposite to the tear line forming block, may be higher than that of the tear line forming block. The cooling and hardening from the outer side can thus be suppressed to reduce the resistance of the material to the stamping during tear line forming.

More specifically, the molding temperature of the mold at its face forming the outer side of the molding opposite to the tear line forming block is kept between the thermal deforming temperature (ASTMD648: 455 k Pa) and the melting temperature till just after the completion of the forward movement of the tear line forming block.

In this construction, moreover, it is desired that the backward movement of the tear line forming block is completed before the mold opening. If the backward movement of the tear line forming block is done after the mold is opened, the drawing resistance of the tear line forming projection is so high that the surface appearance will probably be affected.

In this construction, it is desired that the backward movement of the tear line forming block of the tear line forming projections is done at a plurality of steps. In this way the shape of the tear line forming holes is stabilized. If the tear line forming block is moved backward at an early time, for example in one step while pressure is being applied, the material at the opening of the holes forming the tear line still has fluidity so that there is a possibility it will flow in the direction to close the opening of the tear line forming holes and set in that shape. At a late time just before the mold opening or just before the completion of the cooling time, on the other hand, the drawing resistance of the tear line forming projection is lower than the aforementioned one but may cause a similar problem.

Among the steps of the backward movement of the tear line forming block, the first one usually is during the mold pressurizing time and the last one during the mold cooling time. It is desired that the first and last steps of the backward movement of the tear line forming block are done in 1/10 to 1/2 of the mold pressurizing time and for 1/2 to 9/10 of the mold cooling time, respectively. Moreover, if the backward movement of the tear line forming block is done in two steps, the backward stroke of the first step is 1/10 to 1/2 of the whole stroke.

In the individual constructions thus far described, moreover, it is desired the tear line forming projections are made of a set of conical or frustoconical pins. The material flow is smoothed, and the leading ends of the individual pin holes to be formed by the tear line forming projection are tapered to facilitate the stress concentration and to stabilize the cover portion expandability.

Another object of the invention is to provide a surface portion thermal molding method for thermally molding (or vacuum molding) the surface portion of an automobile interior article having a portion for covering an airbag, suppressing rise in cost and reliably breaking off at tear line portions (portions to be broken). This object can be achieved by the following individual construction.

There is provided a method for thermally molding a surface portion in an automobile interior article having a cover portion enabling an airbag to pop out, wherein surface tear lines on the cover portion are formed simultaneously with the thermal molding of the cover portion, wherein the thermal molding includes a preliminary shaping by a press molding using a pair of male/female dies and a later final shaping by a vacuum molding simultaneous with the die closing, and wherein the vacuum molding is done in the female die, and at the vacuum suction time of the vacuum molding, tear line forming blades embedded in the male die are moved forward and backward to form surface tear lines in the rear face of the surface portion.

After the preliminary shaping by the press molding, the surface portion material is shaped through close contact with the front surface shaping face (the female die shaping face) caused by the vacuum suction so that the nonuniformity of thickness and the poor reproduction of the surface (the design bearing face) can be avoided, unlike shaping with only vacuum molding.

Because of the vacuum molding (or vacuum suction) by the female die, moreover, the die release (or die releasability) after the molding completion is better than the case of the vacuum molding by the male die, which improves the productivity.

Automobile interior article surface portions are extremely thin (e.g., 2 mm or less at most, usually 0.5 to 1.0 mm) so that if groove portions to be broken (or the fragile portions to be broken) are provided, the release from the mold is difficult or is accompanied by breakage of the surface portion.

Moreover, the surface portion tear line portions are formed by protruding the tear line forming blade during the vacuum molding (or at the vacuum suction time), when the surface portion material is still at a thermally deformable temperature, so that the stamping pressure can be low. Even if the surface portion extrusion marks are temporarily formed on the surface, they are leveled (or smoothed) by the vacuum forming to leave no trace of the tear line forming process on the surface.

In the construction described above, it is desired that the temperature (the tip temperature) of the blade (the groove forming blade or projection) the tear line forming blade is higher than the melting temperature of the rear side of the surface portion. The groove portions to be broken are curved (smoothed) on the bottom, all with an equal depth, and not affecting the design on the surface (design face). Specifically, the surface portion tear line portions (or grooves) are formed at the vacuum suction time so that the surface portion material easily escapes. When the grooves are to be thermoplastically deformed by the tear line forming blades (the groove shaping projections), there tends to be much variation in the degree of penetration so that there is much variation in groove depth thereby and also there is formation of ridges along the grooves on the design face side. If slits (or cut grooves) having an extremely small width are formed with the groove forming blade, moreover, there is similar variation in groove depth according to the sharpness of the blade. The variation in the groove depth may easily cause a difference in the breaking characteristics of the grooves to be broken.

The method of molding the automobile interior article of the aforementioned construction employs a thermal mold having the following construction.

There is provided a thermal mold used in a method for thermally molding not only a surface portion in an automobile interior article having a cover portion being developed from which an airbag inflates but also a surface portion tear line portion of the cover portion simultaneously, comprising: a female die for vacuum molding; and a male die for acting with the female die for a press molding, wherein the male die includes a tear line forming blade made movable outward from the face of the male die and also movable to its original position.

In case the surface portion tear line portions (or the portions to be broken) are made of molten grooves, moreover, the tear line forming blade includes heating means for heating an edge portion locally to the melting temperature of the surface portion or higher.

Moreover, the surface portion molded by the aforementioned thermal molding method has the following construction.

There is provided a surface portion in an automobile interior article having a cover portion being developed from which an airbag inflates, comprising a surface portion tear line portion formed in the cover portion on the rear side, wherein the surface portion tear line portion is formed of continuous or discontinuous molten grooves.

Further, the automobile interior article using the aforementioned surface portion has the following construction.

There is provided an automobile interior article comprising a cover portion being developed from which an airbag inflates, wherein cover portion includes a foamed layer between a cover portion substrate and a surface portion having a surface tear line in the cover portion on the rear side, and wherein the surface tear line is formed of molten grooves.

BRIEF DESCRIPTION OF THE DRAWINGS

FIG. 5A is a diagrammatic, partial sectional view of a portion of FIG. 5 that includes a projection, and FIG. 5A shows the projection in a retracted position;

FIG. 5B is a diagrammatic, partial sectional view of a portion of FIG. 5 that includes a projection, and FIG. 5B shows the projection in an extended position;

DESCRIPTION OF THE PREFERRED EMBODIMENTS

Here will be described embodiments of a manufacture method of an automobile interior article of the invention.

Figure 1:
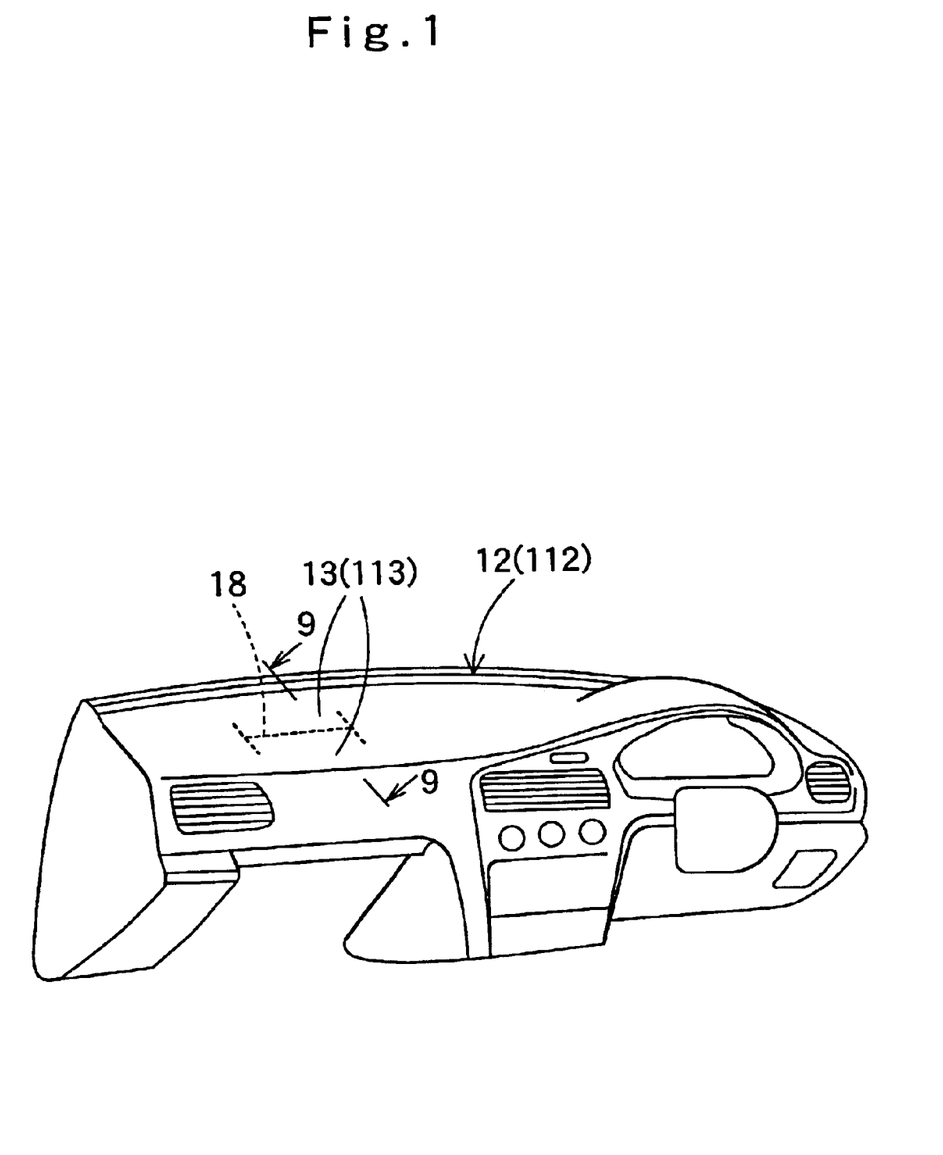
FIG. 1 is an exterior view showing an instrument panel having a cover portion of the prior art.
Figure 2A:
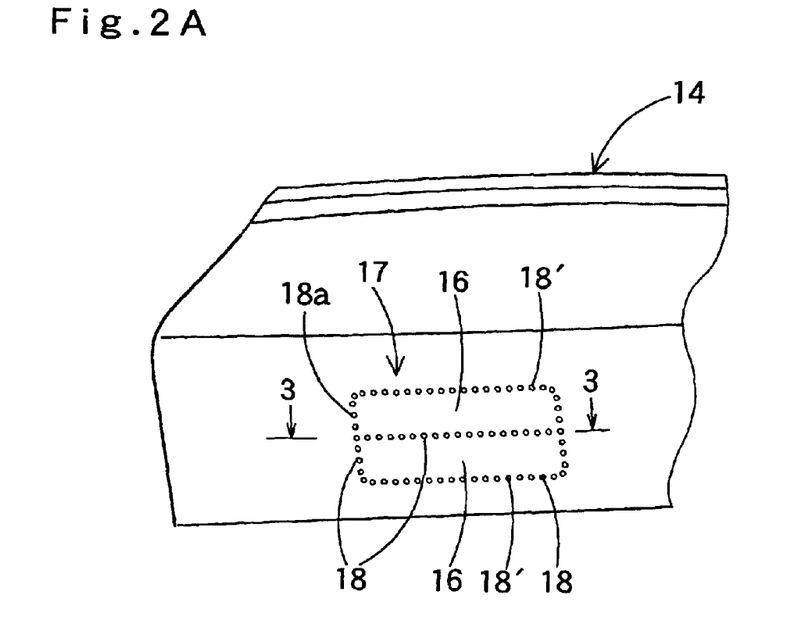
FIGS. 2A and 2B are perspective views showing back faces of essential portions of the individual embodiments of a panel body according to the invention.
Figure 2B:
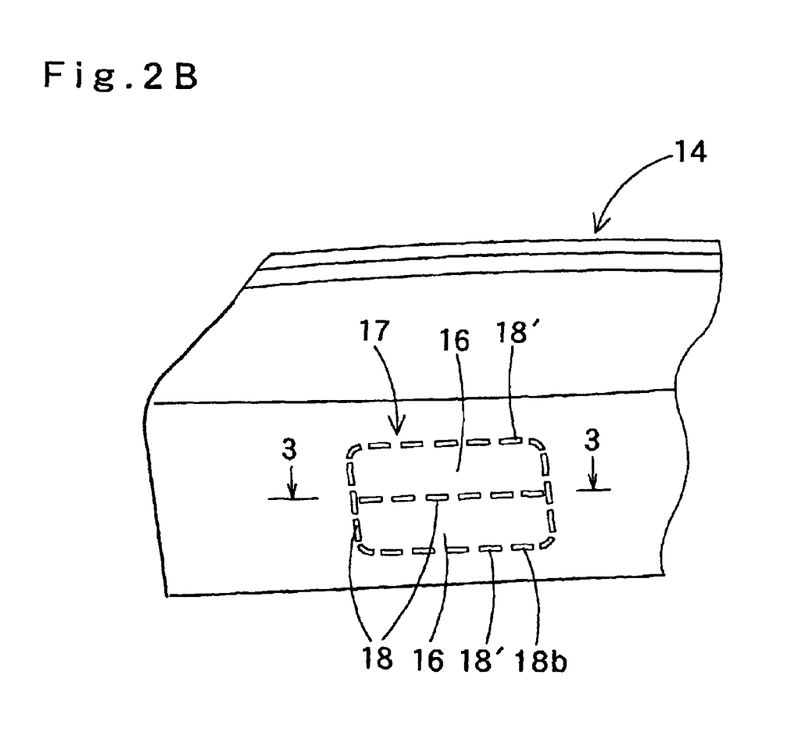

The automobile interior article equipped with a cover portion being developed from which an airbag inflates will be described on the case in which it is applied to a panel 12, as shown in FIGS. 1 and 2. FIG. 1 is a perspective view showing the panel 12 as a whole, and FIGS. 2A and 2B are back views showing an essential portion of a panel body 14.

This panel body (i.e., the automobile interior article body: or the hard resin body) 14 of the panel 12 is manufactured of a hard resin by an integral injection molding method to have a pair of front/rear cover portions 16 and 16, which can be opened like double leaves as in the prior art.

As the molding material and the hard resin, here can be enumerated PPC (carbon-filled polypropylene), PPT (talc-filled polypropylene), PC (polycarbonate)/ABS (terpolymer of acrylonitrile, butadiene and styrene), PC (polycarbonate), ASG (glass fiber filled aryl), ABS (terpolymer of acrylonitrile, butadiene and styrene) and PPE (polyphenylene ether). Of these hard resins, a fiber reinforced crystalline polyolefin resin (e.g., talc-filled polypropylene: PPT) can be suitably used from the standpoint of a light weight.

With the front/rear cover portions 13 and 13 thus double-leafed and hinged, therefore, the panel body 14 is formed of: an H-shaped hinge tear line (or portion to be broken) 18 extending along the turning outer edges of the front/rear cover portions 13 and 13; and front/rear hinged tear lines 20 and 20 jointing the upper/lower ends of the H-shape and extending along the cover hinges. It is requested from the design (for making the lid portions invisible) that the individual tear lines 18 and 20 are not exposed to the surface side but formed in the rear side.

Figure 3A:
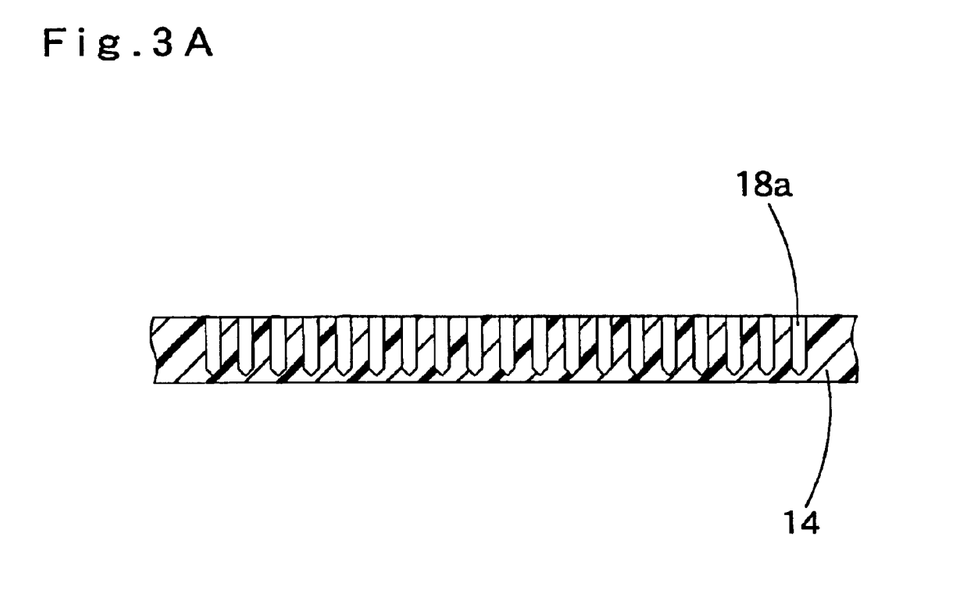
FIGS. 3A and 3B are sectional views taken along lines 3—3 at of FIGS. 2A and 2B.
Figure 3B:
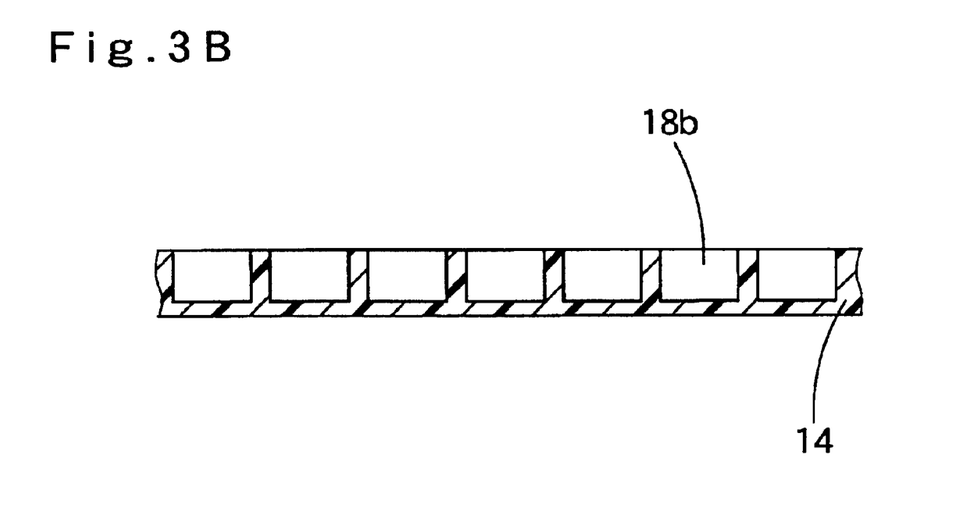

Moreover, the tear line (or lines) 18 consists of a line continuously perforated at a predetermined pitch with round holes or slits (or slots), as indicated by dotted (or broken) lines in FIGS. 2 and 3.

Here, the tear lines in the invention may be formed only of continuous lines (curved or straight) or mixed of continuous lines and discontinuous lines of single- or double-dotted lines, as exemplified in FIGS. 2A and 2B, or may be formed continuously or with dots, only at the corners. In the case of the dotted lines, the tear lines (or portions to be broken) are interruptedly formed to enhance the connection (integrity) between the cover portions 13 and 13 and an outer periphery 17 (the panel body 14) in the automobile interior article body.

Figure 4A:
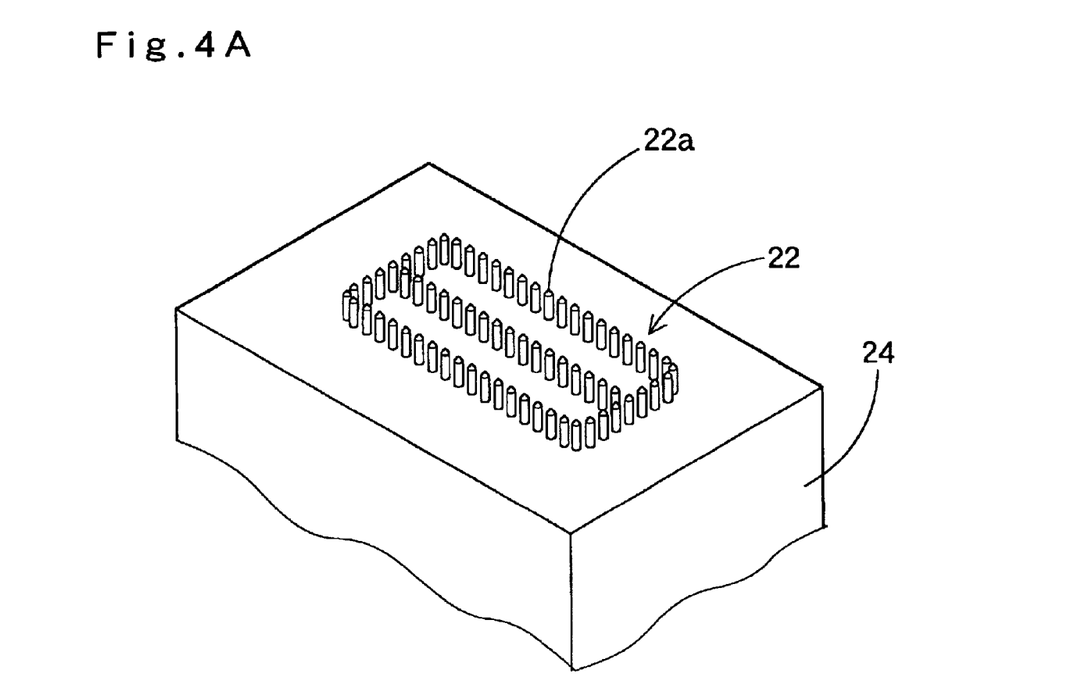
FIGS. 4A and 4B are perspective views showing individual embodiments of a tear line forming block to be used in a manufacture method of the invention.
Figure 4B:
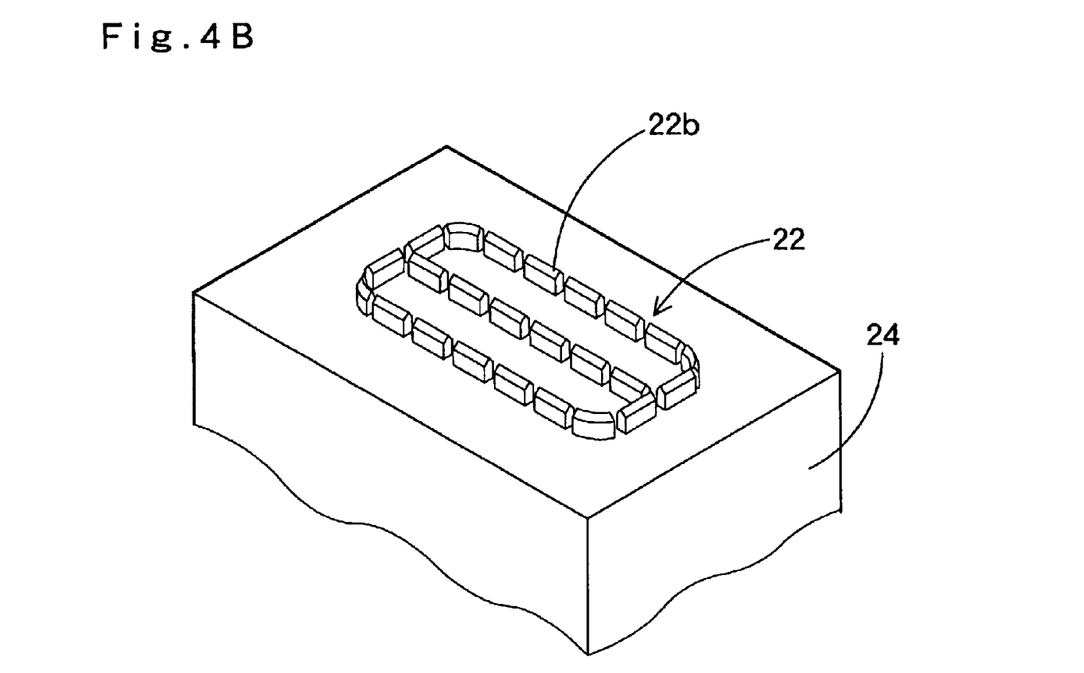
Figure 5:
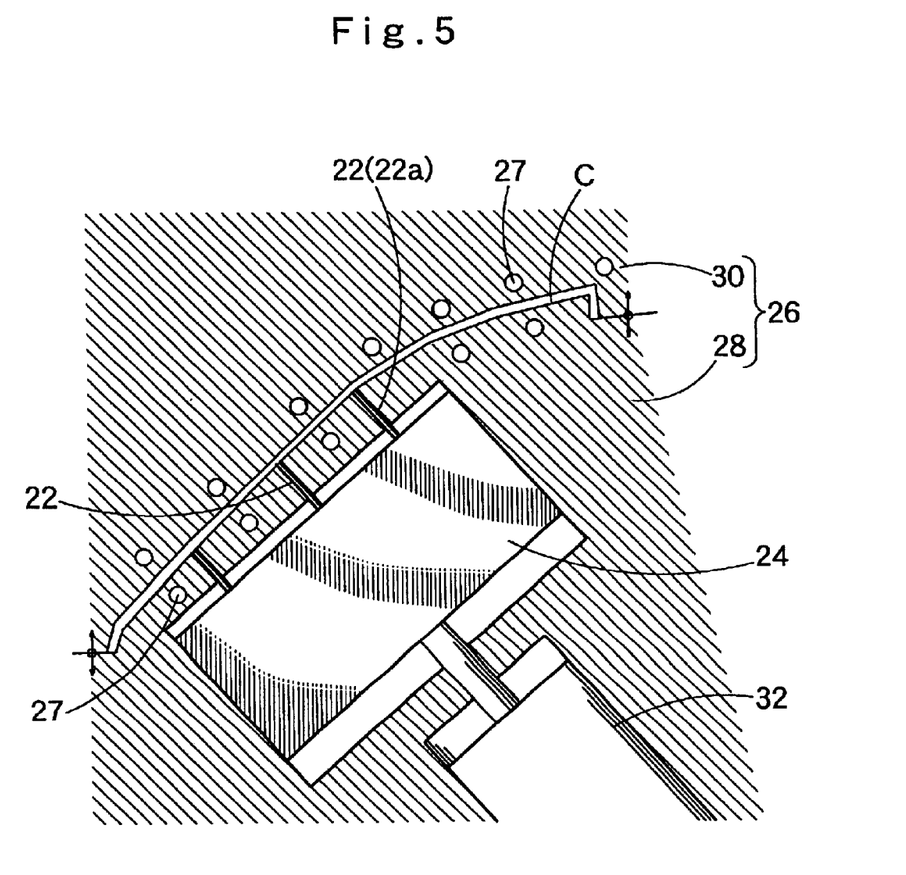
FIG. 5 is a sectional view of a model of an injection mold to be used in the manufacture method of the invention.
Figure 6:
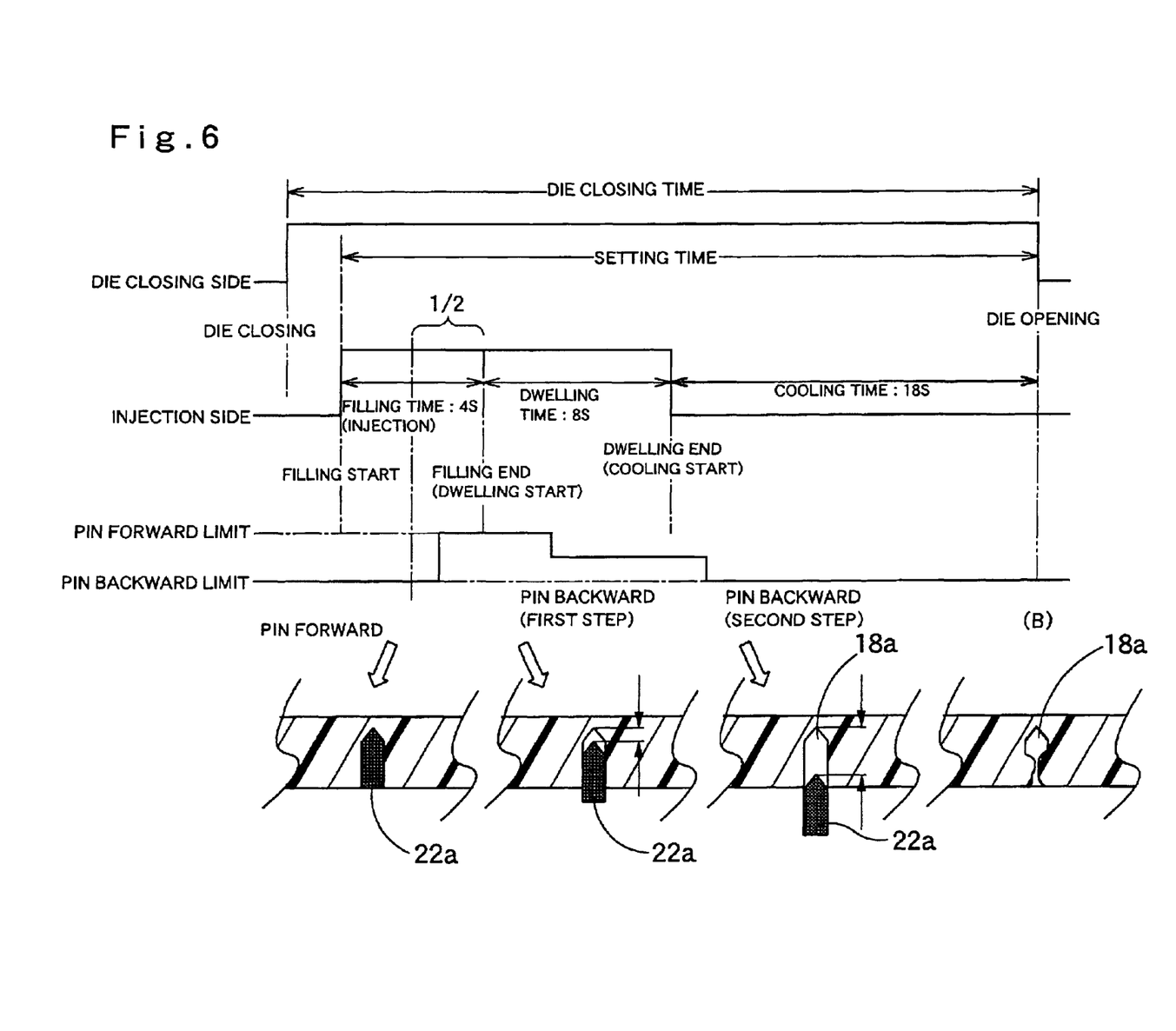
FIG. 6 is a molding time chart showing the forward/backward timings of pins or tear line forming projections in the method for manufacturing an interior automotive trim of the invention.

Here, the tear lines 18 and 20 are formed by the following method (as shown in FIGS. 4, 5 and 6) when the panel body 14 is injection-molded (or die-molded).

Figure 5A:
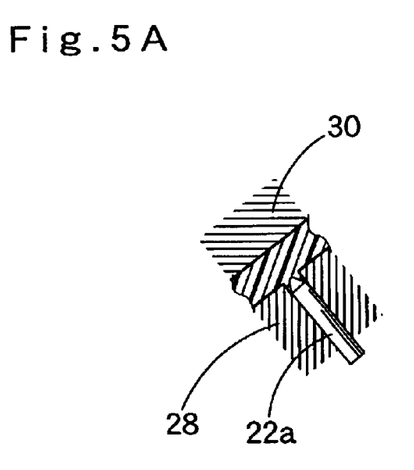
Figure 5B:
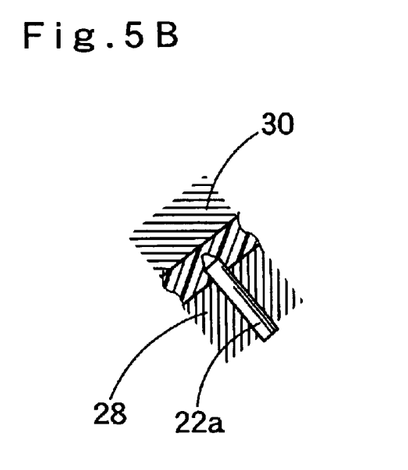

A tear line forming block 24 having tear line forming projections 22 corresponding to the tear lines (or breaking lines) 18 and 20 for the cover portions 13 is moved forward, as shown in FIGS. 5A and 5B, for one half or less of the time period of filling the molding material, that is to say, the tear line forming projections 22 are protruded into a cavity C.

In this embodiment, the tear line forming block 24 is moved forward just after the start of filling, but this forward movement is preferably made within one half or less of the filling time (or injection time), starting from just after the filling start. More specifically, the forward movement is preferably one tenth to one half of the filling time, or more desirably from one tenth to one third. In case the filling time (or injection time) for the PPT is 15 seconds, for example, the forward movement time is 1.5 to 7 seconds (or 5 seconds). If the forward timing of the forming block 24 is excessively early, a material flow failure or a sink mark is easily caused and there are defective moldings as a result. If excessively late, on the other hand, the material solidification (setting) of the mold cavity face starts and the tear line forming projections 22 form extrusion marks on the design surface.

Now, just after the filling of the material starts, tear line forming projections 22 are midway from the gate side of the in the cavity C so that the obstruction to the material flow is less than that of the case in which the forming block 24 is moved forward before the injection start. Moreover, the material is not completely filled before the end of the filling time (or filling step), i.e., before the continuous pressure step, and the setting of the material has hardly progressed, as compared with the case of the prior art, in which the forming block 24 is moved forward after the end of the filling (or before the continuous pressure step).

Therefore, even if the tear line forming projections 22 are protruded into the cavity C by the forward movement of the forming block 24, therefore, the smooth escaping flow of the material at the contact positions of the tear line forming projections 22 can be ensured. Therefore, the dents of the tear line forming projections are not visibly left in the surface side.

After the end of the filling (injection), moreover, the tear line forming block 24 is moved backward before the die (mold) opening. When the tear line forming block 24 is moved backward after the die opening (or after completion of the setting time), the drawing resistance of the tear line forming projections 22 (or pins 22a) is raised and this often causes a problem in the pin release characteristics.

Specifically, the tear line forming projections 22, i.e., the tear line forming block 24 is moved backward in a plurality of steps (two steps in the shown embodiment).

The backward movement of the first step of the tear line forming block 24 is made for in the continuous pressure period, and the second step of backward movement of the tear line forming projections 22 (or pins 22a) is made in the cooling period (as referred to the time charts of FIGS. 6A and 6B). Here, the backward movement of the tear line forming projections 22 could be made at one step, but the aforementioned problems might easily occur (as exemplified by the irregularities of the tear line forming holes or the increase in the pin releasing resistance). In this embodiment, moreover, the backward movement of the tear line forming block 24 is made at the two steps so as to simplify the control but may be made at a plurality of (e.g., three to five) steps.

Here, the continuous pressure time period is the time period for holding the injection pressure after the molding material is injected (i.e., after the end of the filling time), and is intended to prevent the back flow of the filling material in the mold and to apply a sufficient pressure to the filling material in the mold.

In order to cool and set the thermoplastic resin, as exemplified by the PPT, its temperature is usually adjusted to the temperature of the mold, 40 to 60° C., by water passages 27 and 27. In the case of the crystalline polymer or the polypropylene (PP), for example, the temperature of the mold is the lower and so the strength is low, but the shock resistance is increased. In this way the molding temperature is suitably set according to the characteristics demanded for the panel body 14.

It is desired that the injection pressure of the mold of the outer shaping face, i.e., the opposite side to the tear line forming block 24, is higher than that of the tear line forming block 24, namely, that the temperature of a female die 30 is kept at the thermal deforming temperature (ASTMD648: 455 k Pa) of the molding material till just after the end of the forward movement of the tear line forming block 24.

Here, in the case where the molding material is PP (or homopolymer), the melting point (isotactic PP) is 165° C., and the thermal deformation temperature (of injection moldings) is 102.2° C. (refer to Item "Propylene Polymer" of "Grand Dictionary of Polymers", Maruzen, Sep. 20, 1994). In case the molding material is PPF, therefore, the temperature of the female die is usually controlled to 110 to 150° C., or desirably to 120 to 140° C. from the standpoints of productivity, thermal efficiency and so on.

Moreover, the first step of the backward movement of the tear line forming block 24 is made in $1/10$ to $1/2$ of the mold continuous pressure period, and the second step (or final step) of the same is made in $1/2$ to $9/10$ of the mold cooling period.

Moreover, the first step of the backward movement varies according to the initial fluidity of the molding material, but is set to $1/10$ to $1/2$ of the whole stroke. For instance, if the pin hole bottom wall thickness is 0.3 mm, the tear line forming hole depth is set to 2.2 mm and the pin diameter to 0.5 mm, and the whole pin backward stroke is about 1.8 mm so that the first-step pin backward stroke is 0.2 to 0.9 mm.

The numerical ranges thus far enumerated are not absolute, but the optimum numerical values are influenced by the setting characteristics and the injection temperature of the molding material and by the mold temperature.

In the case where the molding material is PPF and where the injection time is 4 seconds, the continuous pressure period is 8 seconds and the cooling time is 18 seconds for example, the backward movement of the pins of the first step is made 3 to 6 seconds after the start of continuous pressure, and the backward movement of the pins of the second step (or the final step) is made 5 to 15 seconds after the cooling start.

When the pin extraction (i.e., the backward movement of the tear line forming projections 22) is thus made in two steps, that is, when the backward movement of the tear line forming block 24 is made in two steps, there arises none of the aforementioned problems. Specifically, there arises neither the problem, as might otherwise be caused in the openings of tear line forming holes (or pin holes) 18a by the excessively early pin extraction, of closing deformation (as referred to FIG. 6B) of the pin hole root portions nor the problem, as might otherwise be caused by the excessively late pin extraction, of the increase in the pin extraction resistance.

At positions of line 3—3 at FIG. 2A, there is formed the tear line 18 which is composed of the dotted pin holes 18a, as shown in FIG. 3A. Here in case a set of fins (or thin sheets) 22b is used as the tear line forming projections, the tear lines 18 and 20 are formed of slits 18b.

At the positions of line 3—3 of FIG. 2A, there are then formed the tear lines 18 and 20 which are composed of the dotted pin holes 18a, as shown in FIG. 3A. In case a set of the fins (or thin sheets) 22b is used as the tear line forming projections, there are formed such tear lines 18 and 20 at positions of line 3—3 as in FIG. 2B composed of the chained slits 18b, as shown in FIG. 3B.

At the end of the setting time (or the cooling time), moreover, the mold is opened and then released.

An injection mold 26 to be used herein is basically constructed of a male die (or a bottom force of moving type) 28 and a female die (or a top die of stationary type), and the tear line forming block 24 is slidably buried in (or attached to) the male die 28 through a hydraulic cylinder or the like. The tear line forming projections 22 formed in the forming block 24 are continuously juxtaposed needle pins or sheet-shaped projections 22a, as shown in FIG. 4A or 4B.

At this time, the leading ends of the needle pins or sheet-shaped projections 22a are formed to have a tapered cross section. This is because this leaves the profile of the material smoothed and uniform with less traces of tear line formation work and raises the tearability of the tear lines thereby to contribute the quick expansion of the airbag. The longitudinal direction of the sheet-shaped projections 22a follow the direction of the material flow, especially in case they have the tapered leading ends, so that the resistance to the material flow is low even if the tear line forming projections 22 are protruded before the end if filling.

Here, in the case of the body thickness of 3 mm, for example, the specifications of the tear lines (or portions to be broken) 18 and 20 in the panel body 14 are: a set hole diameter of 1.0 to 1.5 mm (for the pin holes) or 2 to 4 mm (for the slit holes); hole pitch=the hole diameter+0.4 to 1.0 mm; and a left hole thickness of 0.5 to 0.05 mm. In case the breaking characteristics demanded are different for the swinging portion tear lines 18 and the hinge portion tear lines 20, they are adjusted by varying the hole pitch, the hole diameter and so on. Usually, it is required that the hinge portion tear lines can be torn by a lower force.

Figure 7:
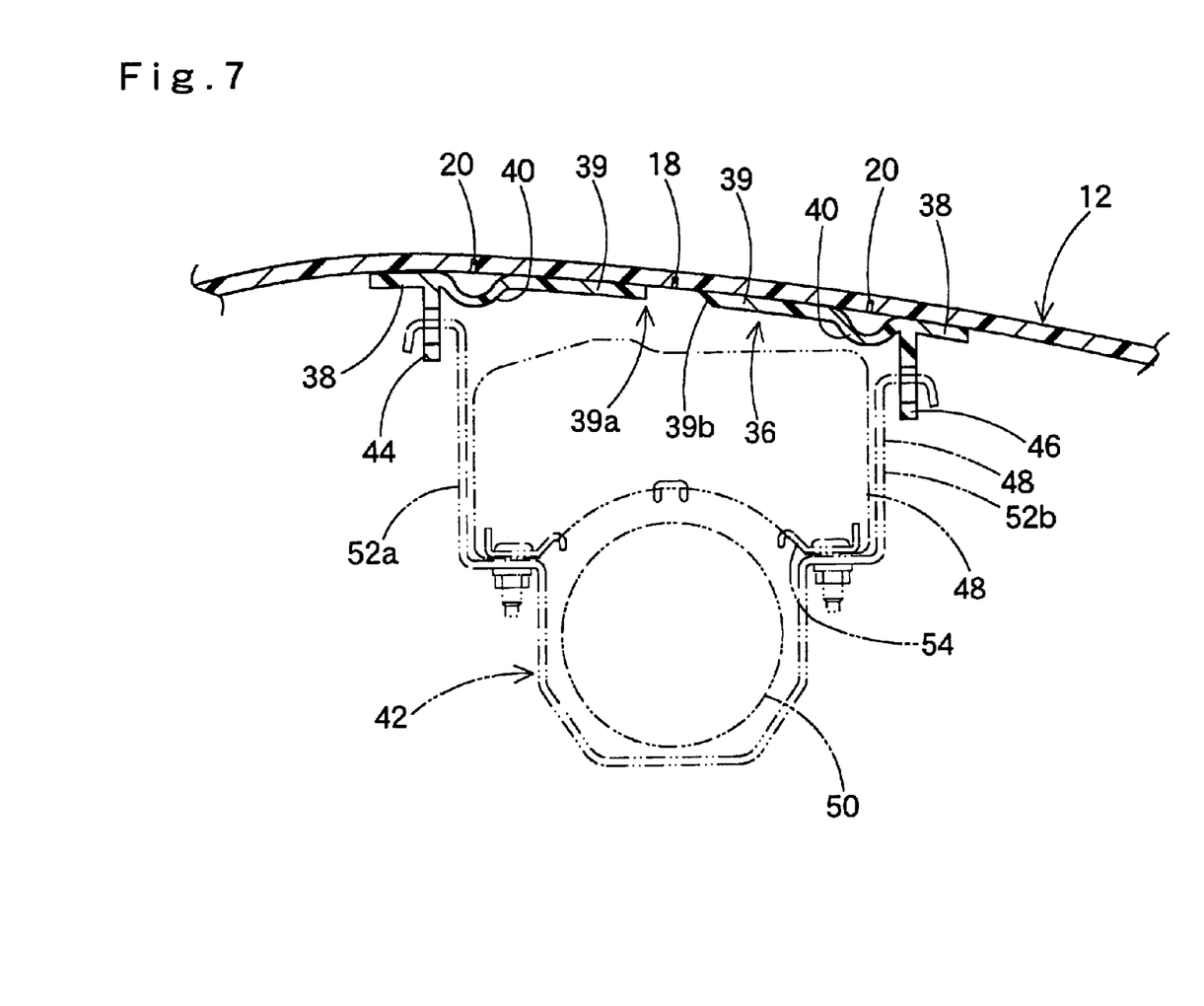
FIG. 7 is a sectional view for explaining a mounting mode of a panel using the panel body manufactured by the method of the invention.

The panel body thus manufactured is used as the panel by jointing it to a soft resin connector 36.

This soft resin connector 36 is made of a soft resin so as to smoothen the hinging action in the front/rear curved hinge portions 40 and 40 and to prevent the airbag from being damaged.

From a similar standpoint of a lighter weight, the soft resin can be suitably exemplified by a non-polar thermoplastic elastomer such as olefins (TPO), 1,2-PB (RB) or styrenes (TPS). It is also possible to use a polar thermoplastic elastomer such as polyesters (TPEE), amides (TPA) or urethanes (TPU).

The soft resin connector 36 is provided with: elongated front/rear stationary plate portions 38 and 38 which are jointed on the back of the panel body 14 to the outer side portions of the hinges (or the hinge portion tear lines) of the cover portions 13 and 13; and a pair of front/rear turning plate portions (or turning portions) 39 and 39 which are jointed to the backs of the cover portions 13 and 13 from their individual stationary plate portions 38 and 38 through the curved hinge portions 40 and 40 and which are made discontinuous at turning ends 39a and 39b. Moreover, the soft resin connector 36 in the shown embodiment is further provided with front/rear mounting walls 44 and 46 which are jointed to an airbag module 42 from the front/rear stationary plate portions 38 and 38.

Moreover, either the joints of the individual stationary plate portions 38 and 38 to the back of the panel body 14 or to the cover portions 13 and 13 of the turning plate portions 39 and 39 are made usually by full face adhesion (or the chemical bonding) but may be made by a partial bonding or by a nonadhesive bonding (i.e., a mechanical bonding) using thermal caulking rivets. Moreover, the front/rear mounting walls 44 and 46 need not be formed of a portion of the soft resin connector 36 but may be two-color molded of different materials or may be protruded in a split state from the panel body (or the hard resin body).

The panel 12 thus far described is assembled for use with the airbag module 42 and mounted on an actual automobile.

The airbag module 42 is basically constructed of a bag body 48, an inflator 50 for introducing an inflating gas into the bag body 48, and a bag case 52 for integrating those members. The bag case 52 is integrated with a retainer 54 for retaining the inflator 50 and for acting as a diffuser plate to guide the inflating gas introduction into the bag body 48.

Into front/rear walls 52a and 52b of the bag case 52, there are inserted the front/rear mounting walls 44 and 46 of the soft resin connector 36 formed on the jointed back of the panel body 14, to form an airbag assembly, and this airbag assembly is mounted on the car body (or the actual automobile) through the not-shown brackets.

Figure 8:
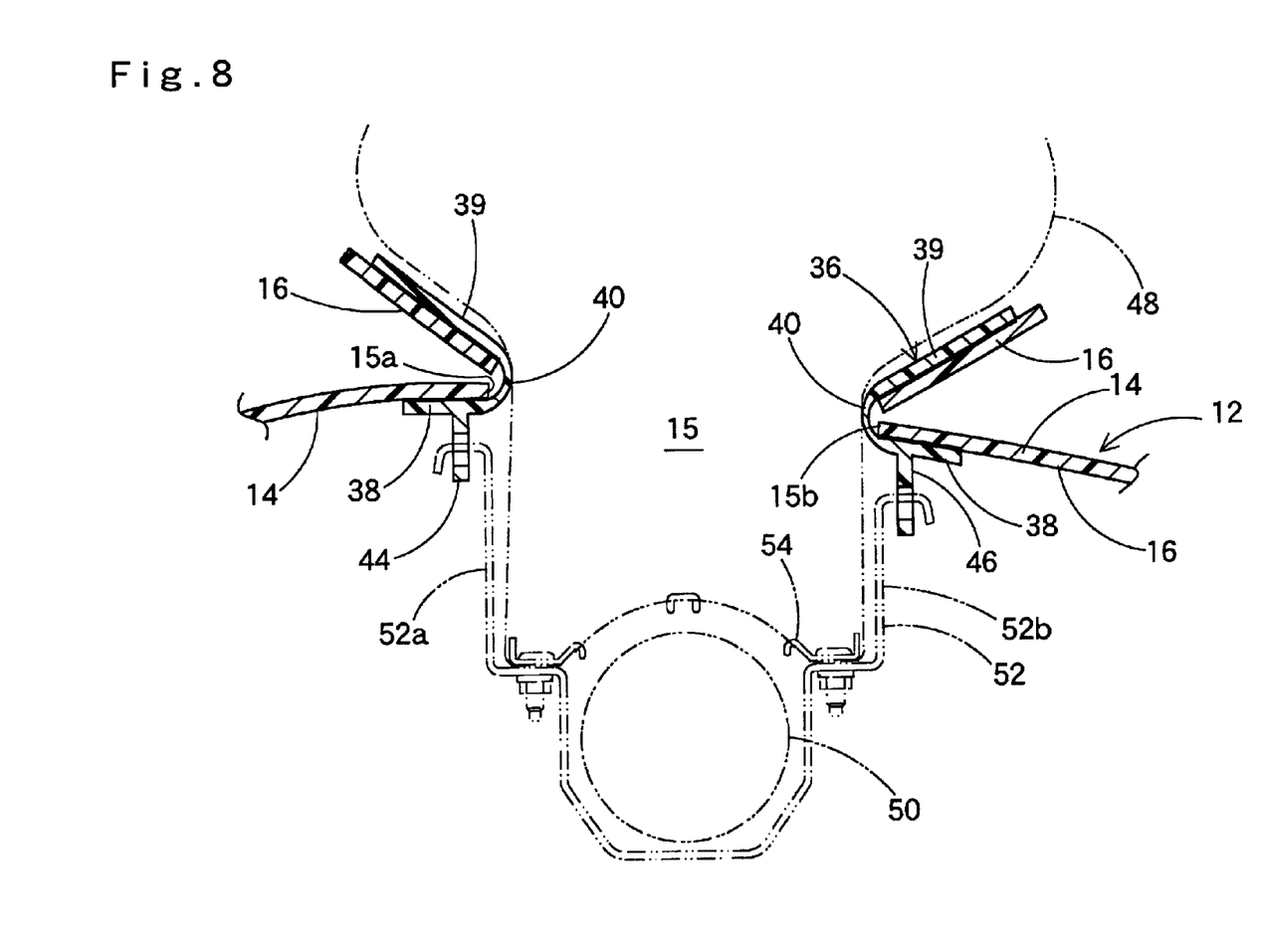
FIG. 8 is a sectional view for explaining the same at the time when an airbag is expanded.

When an impacting load at a predetermined or higher value is applied to the car body, moreover, the turning portion tear lines 18 and the hinge portion tear lines 20 of the back cover portions 13 and 13 are broken in the following manners. The cover portions 13 and 13 are separated (or double-leafed) from the panel body 14 to form the airbag pop-out port 15, through which the airbag (or the bag body 48) is rapidly inflated and expanded.

First of all, the bag body 48 is inflated to push the panel body 14 on the rear side (or the lower face). Then, the stress is concentrated on the center tear line of the H-shaped turning portion tear lines 18. This breakage propagates to the right and left tear lines so that the cover portions 13 and 13 are turned out (or double-leafed). Simultaneously as the cover portions 13 and 13 are turned in the opening directions, moreover, the stress is concentrated at the hinge portion tear lines 20, breaking these lines so that the cover portions 13 and 13 are separated from the panel body 14. The curved hinge portions 40 of the soft resin connector 36 are so deployed to the front and back (as in FIG. 8) so as to clamp the edge portions 15a and 15a of the airbag pop-out port 15 of the panel body 14 formed by the separation of the cover portions 16. Then, the airbag (i.e., the bag body 48) pops out from the airbag pop-out port 15 to protect the occupant of the automobile.

Here, the embodiment thus far described exemplifies the case in which the cover portions are double-leafed. Even in case the cover portion is single-leafed, however, the remaining operations are similar excepting that the tear line is shaped into a rectangular shape.

Next, the method of forming the tear lines in the automobile interior article of the invention will be described on the case (as in FIGS. 1 and 9), in which the tear lines are thermally molded in the back of the surface portion of a panel 112 having a laminated construction.

Figure 9:
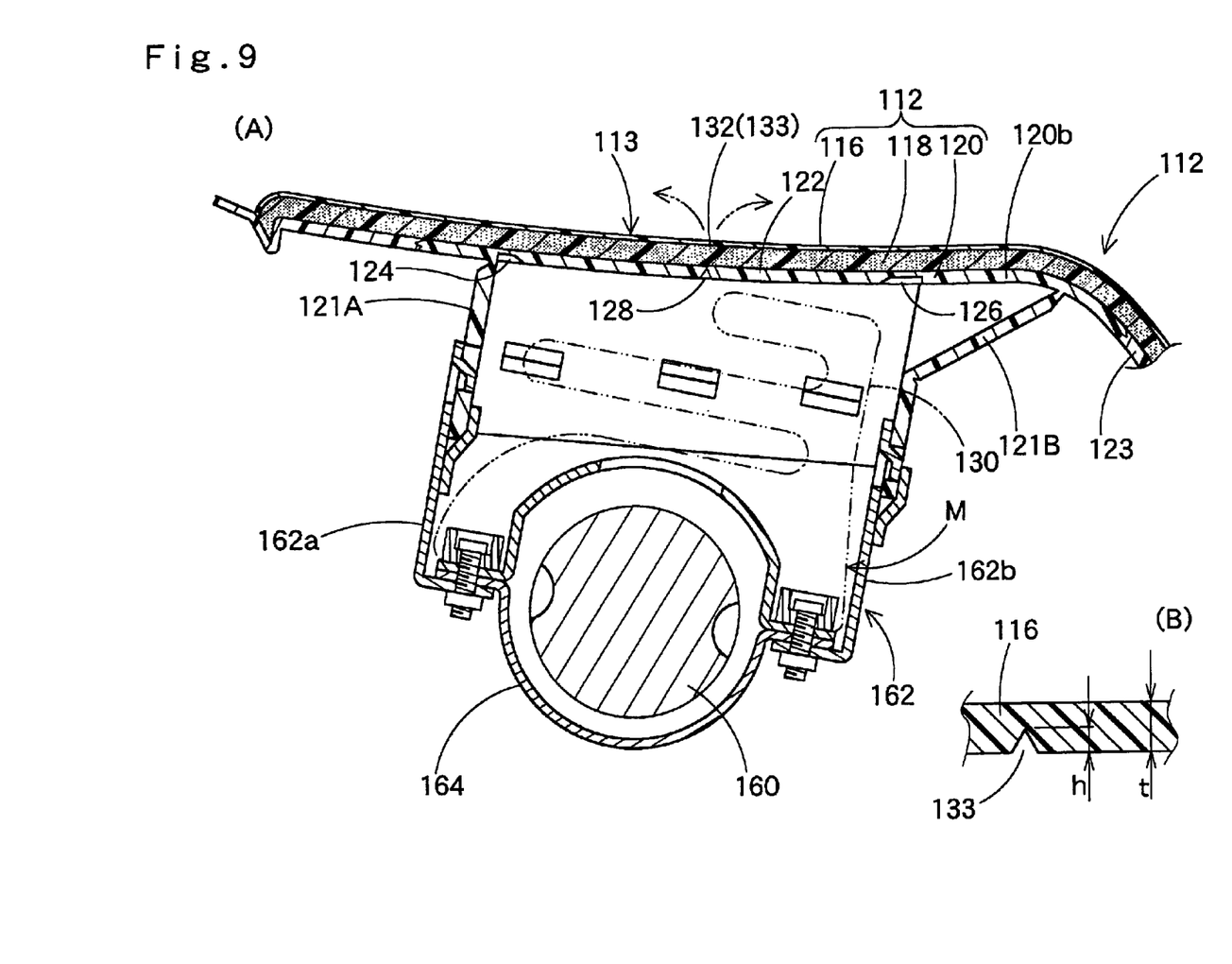
FIG. 9 is a schematic section of a portion belonging to another embodiment of the invention and taken along line 9—9 of FIG. 1.

Moreover, a surface portion 116 in the panel 112 is used in a relief line-less manner, i.e., to form an invisible lid type cover by forming the surface portion tear line portions (or grooves) in the back of the surface portion (as referred to FIG. 9B).

At this time, the surface portion tear line portions (or grooves) 133 have a depth h of h=0.2 to 0.5 mm where the surface portion thickness t=0.7 mm. If the depth h is excessively small, it is difficult to retain the breaking rapidity (or the airbag expanding performance). If the depth h is excessively large, traces of the tear line formation work readily appear on the surface portion tear line portion 133 design face (visible surface). In other words, the tear line grooves may be seen through the surface cover.

Moreover, the aforementioned surface portion is prepared by the thermal molding method (i.e., a kind of molding method).

Here, the surface portion material (or work) is prepared by cutting such a sheet material made of a thermoplastic elastomer (TPE) material such as olefins, esters, amides, styrenes or urethanes by a calendering method or an extrusion molding method to a suitable size. Of the above-specified TPE, the polyolefins are desirable because they provide a wide range of hardness to select from.

Figure 10A:
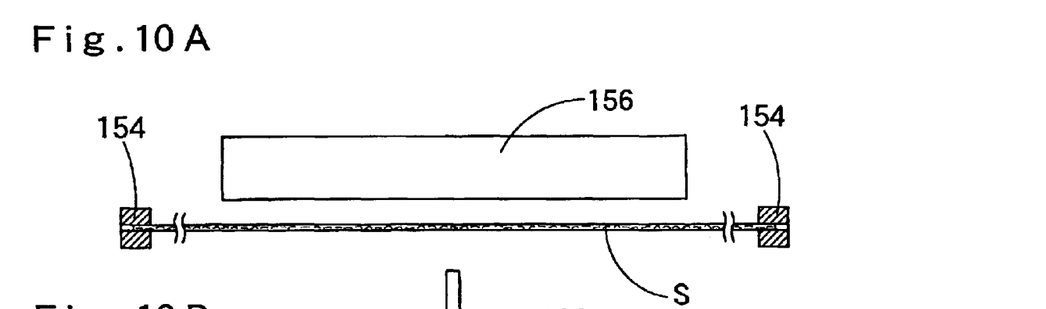
FIGS. 10A to 10C are schematic step diagrams showing a method (or a thermal molding method) for manufacturing a surface portion in the invention.
Figure 10B:
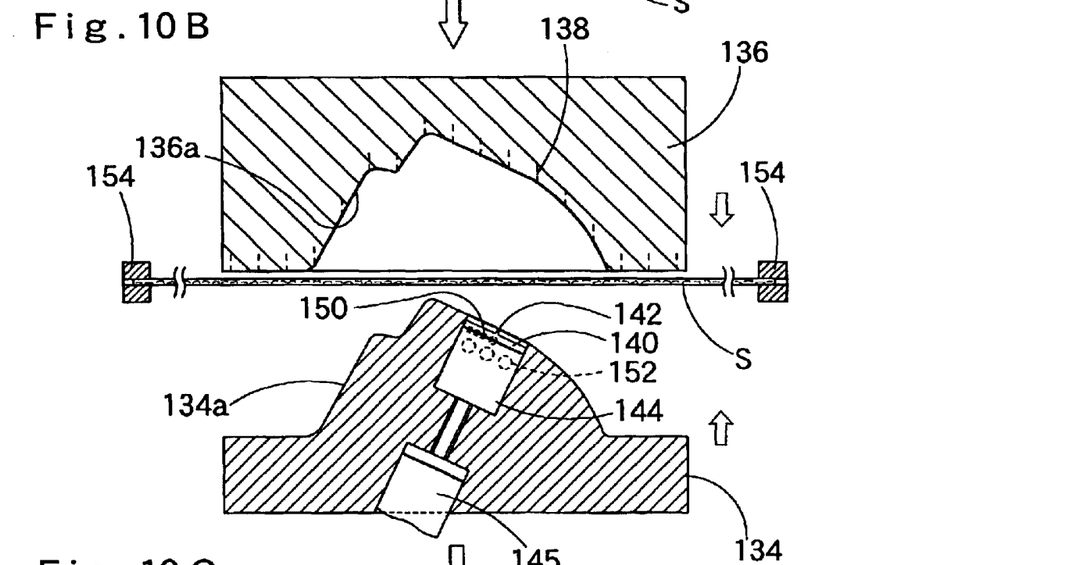
Figure 10C:
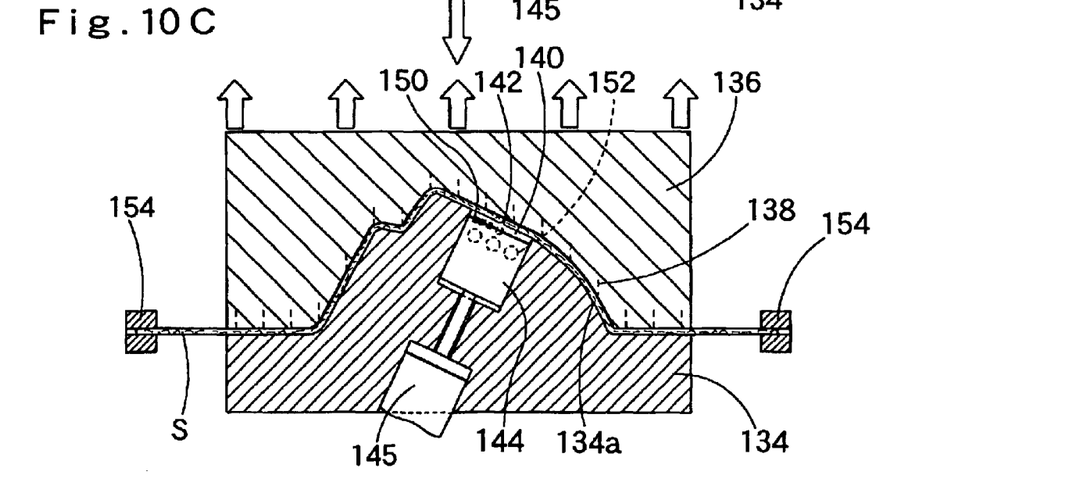

Moreover, the thermal molding is done by the method in which a preliminary shaping is done by a pressing method using a male die 134 and a female die 136 and in which a final shaping is then done simultaneously with the die closing by a vacuum molding.

Here, a number of vacuum suction pores 138 are formed in the design (or surface) shaping face of the female die 136. This structure is made for vacuum shaping (or vacuum molding), especially for design face shaping in the female die 136. Because of the vacuum shaping by the female die, the vacuum-shaped surface portion material (or the thermal molding) is easily released from the female die 136. Moreover, the design face shaping is done by the vacuum method so that the design face can be excellently reproduced. In case the vacuum suction pores 138 are large, the vacuum suction pore traces may be left in the surface portion face (or the design face) so that a female shaping face 136a usually provides an embossing face (cast embossing face).

Moreover, these vacuum suction pores 138 have a diameter of 1 to 10 microns, and the pore pitch is 5 to 15 mm and desirably about 10 mm. If the pore diameter is excessively large, the suction pore traces are easily left in the surface portion design face (if not an embossed face). If the pore diameter is excessively small, on the contrary, the suction resistance is so high as to make it difficult to reproduce the fine shaping face. If the pore pitch is excessively small, the number of steps of working the mold increases. If the pore pitch is excessively large, it is difficult to attain the suction shaping force sufficiently and, as in the case of the excessively small pore diameter, to reproduce the fine shaping face.

Figure 11:
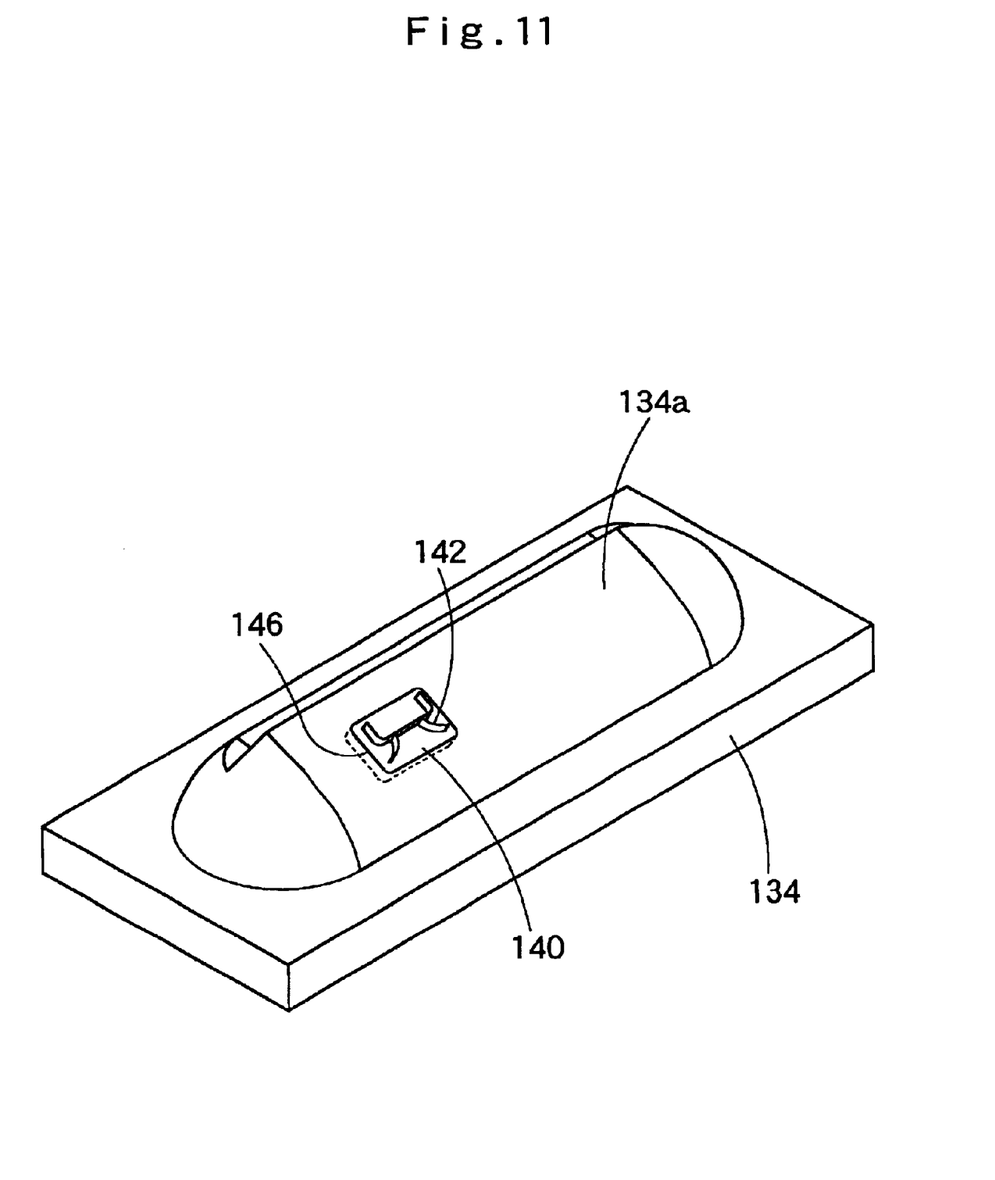
FIG. 11 is a schematic perspective view of the male die (plug) of FIGS. 10A to 10C.

To (or in) the male die 134, moreover, there is attached (or buried) a tear line forming blade 140 in a forward/backward moving manner, as specified below.

Specifically, the tear line forming blade 140 is sheet member having a deformed H-shaped ridge (blade) 142 is jointed to a blade holding block 144 and held slidably in a tubular recess 146 formed in the male die (of a plug type) 134.

Figure 12:
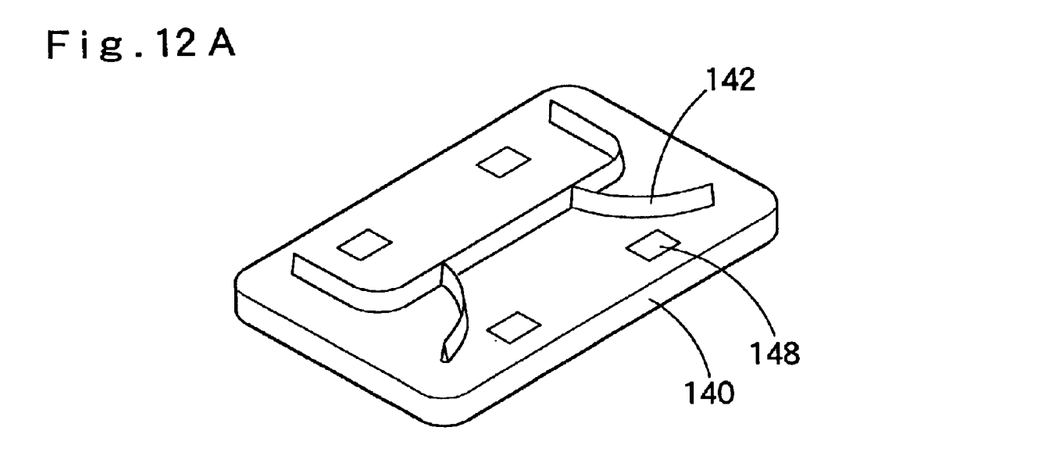
FIGS. 12A to 12C are perspective views showing the individual modes of a tear line forming blade in FIG. 11.

Here, the blade is usually formed of the continuous member 142 (FIG. 12A), a discontinuous member 142A (FIG. 12B), or a mixture of a continuous member 142B and a discontinuous member 143 (FIG. 12C). At this time, the nose angles of the edge portions 142, 142A and 142B are suitably selected from a range of 7 to 30 degrees. In the discontinuous shape, moreover, a:b=5:0.5 to 0.5:0.5. Here, the discontinuous member 143 shown in FIG. 12C is formed by arranging needles of φ=about 1 mm continuously. In the tear line forming blade 140, moreover, there are buried four proximity sensors 148 which when the blade is carried forward by the blade holding block (or the tear line forming block) 144 by an air cylinder 145 prevent the surface portion tear line portions (or grooves) 133 from becoming excessively deep. Specifically, the proximity sensors 148 feed their detected signals to the drive unit (or the not-shown air pump) of the air cylinder 145. Moreover, the proximity sensors 148 are able to adjust the upper limit position of the edge portions 142 in the tear line forming blade 140 stepwise, i.e., so that the remaining thickness is 0.3, 0.14 or 0.5 mm in the surface portion tear line portions 133.

Moreover, the blade holding block 144 is jointed to the air cylinder 145 so that the edge portions 142 of the tear line forming blade 140 may move forward and backward to and from the embossing face (or the shaping face) 134a of the male die 134.

To the surface side of the blade holding block 144, there is attached a temperature sensor 150, on the inner side of which there is buried an electric heater (or a sheathed heater) 152. The temperature sensor 150 measures the temperature of the edge portions 142 and feeds its detection signal to the electric heater 152. Here, this electric heater 152 can heat the edge portions 142 so locally as to impart a slightly higher temperature than the melting temperature of the back of the surface portion material.

In case the surface portion material is TPO, for example, it is set to 180 to 200° C., slightly higher (10 to 20° C.) than the melting point of 170° C.

Here will be described the method for thermally molding the surface portion by using the male die and the female die thus constructed.

First of all, a generally square sheet material S to be the surface portion is chucked (or clamped) at its four sides (or its whole periphery) by a square chuck (or clamp) 154 and is heated to a thermally deformable temperature of about 1,160° C. by a sheet material heater 156.

Subsequently, the sheet material S is moved while being clamped by the clamp 154 to just below the female die 136, and the female die 136 is then moved downward. Simultaneously with this, the male die 134 is moved upward. The downward/upward moving speed at this time is set to 1,000 to 3,000 mm/min.

At the instant (usually of 1 to 2 seconds) just before the die closing time, namely, at the preparatory shaping instant, the vacuum suction is started. Simultaneously with this, the electric heater 152 is energized to heat the blade portions 142 locally to 180 to 230° C., and the air cylinder 145 is driven to move the block member 144 forward.

Then, the design face surface portion material S is brought close to the shaping face (or the design face) of the female die 136 by vacuum, thereby to reproduce the design face satisfactorily. The evacuation time at this time is 10 to 15 seconds (or 8 to 14 seconds after the die closing is completed), and the blade protruding time (or the tear line forming time) is 5 to 7 seconds.

After the evacuation, the thermal molding is completed through the cooling time (or the standing time) of about 20 to 30 seconds. In short, the die is opened about 30 to 145 seconds after the die closing.

The surface portion thus thermally molded is trimmed to the shape of a surface portion for the panel after being released.

Here will be described a method of molding the panel 112 using the aforementioned surface portion.

The surface portion 116 formed according to the first embodiment can be used like that of the prior art as the surface portion for the automobile interior article.

The panel 112 (as referred to FIG. 9) can employ a combination of such a panel substrate 120 made of plastic materials of PPC (carbon-filled polypropylene), PPG (glass fiber filled polypropylene), PC (polycarbonate)/ABS (terpolymer of acrylonitrile, butadiene and styrene), PC (polycarbonate), ASG (glass fiber filled aryl), ABS (terpolymer of acrylonitrile, butadiene and styrene) and PPE (polyphenylene ether), aluminum or steel sheet and a foamed layer (or cushion layer) 118 of a foamed material such as urethane, PPF or PP beads.

The panel 112 is manufactured by the usual method, as follows.

First of all, the surface portion 116 (having a thickness of about 0.7 mm) thus manufactured is set in the female die of the foamed layer injection mold, and the panel substrate 120 injection-molded in advance is set in the same female die. After the die closing, the foamed layer material is injection-molded to mold the panel 112 which is basically composed of the substrate 120, the foamed layer 118 and the surface portion 116, as shown in FIG. 9. Here, a male die in the mold for the substrate 120 which does not release the substrate 120 may be used as well.

The panel 112 has an airbag device M assembled therewith and is mounted for use on the actual automobile.

The airbag device M is basically composed of a bag body 130, an inflator 160 for introducing the inflating gas into the bag body 130 and a bag case 162 for integrating the bag body 130 and the inflator 160. The bag case 162 holds the inflator 160 and has a diffuser can 164 integrated for guiding the introduction of the inflating gas into the bag body 130.

Moreover, the airbag assembly is made by inserting front/rear mounting walls 121A and 121B formed on the back face of the substrate 120 into front/rear walls 162a and 162b of the bag case 162, and the airbag assembly is mounted on the car body (or the actual automobile) through the not-shown brackets.

When an impacting load at a predetermined or higher level is applied to the car body, moreover, the tear lines T of a bag cover portion 113 are broken and opened in the following manner so that the airbag is rapidly inflated and expanded.

First of all, the bag body 130 is inflated to push the substrate 120 on the rear side (or lower face). At this time, the stress is concentrated in the substrate tear line grooves 128 which are formed by notching the substrate 120 in a V-shape, so that the portions of the substrate forming tear line grooves 128 are broken. After this, the stress is concentrated on the lines (at the shortest distance) joining the substrate tear line grooves 128 and the surface portion tear line portions 133 within the foamed layer 118, thereby to propagate the cracks to the surface portion tear line portions 133. When this crack propagation reaches the surface portion tear line portions 133, the stress is concentrated at the tear line portions 133 which are weaker than the remaining portions of the surface portion 116. Therefore, the surface portion 116 is broken (or torn) far before the elongation of the surface portion 116 reaches the intrinsic breaking point. Therefore, the surface portion 116 does not extend and so delay the complete deployment of the bag cover portion, so that the bag extension characteristics can be retained. In other words, the surface portion in the panel having an invisible type bag door portion can be manufactured without any special after-treatment (or after-working).

Here, the technique for forming the surface portion tear line portions simultaneously with the vacuum molding is disclosed in the publications such as Unexamined Published Japanese Patent Applications Nos. 126222/1992, 2189/1997 and 159047/2000, although these have no effect on the patentability of the present invention.

What is claimed is:

1. A method for forming tear lines in the rear side of an automobile interior article having a cover portion from which an airbag inflates, wherein, when either an automobile interior article body having an integrally molded surface portion or an automobile interior article surface portion is to be molded, the mold is opened after tear line forming projections are moved forward and backward with the mold closed, and wherein the backward movement of said tear line forming projections is completed before the opening of the mold.

2. A method for manufacturing an automobile interior article body having a cover portion from which an airbag inflates, wherein said cover portion is molded of a hard resin material integrally with remaining portions of the interior article body, and wherein a tear line forming block having continuous or discontinuous tear line forming projections corresponding to the tear lines for said cover portion is moved forward within the time period of the molding procedure from just after the start of material filling to the end of filling, to form the tear lines, and wherein the tear line forming block is moved backwards before the mold is opened.

3. An automobile interior article body manufacturing method according to claim 2, wherein the forward movement of said tear line forming block is done within one half of the time taken for filling of the molding material.

4. An automobile interior article body manufacturing method according to claim 2, wherein the forward movement of said tear line forming block is done in 1/10 to 1/2 of the filling time.

5. An automobile interior article body manufacturing method according to claim 2, wherein said tear line forming projections are made of a set of conical or frusto-conical pins.

6. A method for manufacturing an automobile interior article body having a cover portion from which an airbag inflates, wherein said cover portion is molded of a hard resin material integrally with the remaining portions, and wherein a tear line forming block having continuous or discontinuous tear line forming projections corresponding to the tear lines for said cover portion is moved forward within the time period of the molding procedure from just after the start of material filling to the end of filling, to form the tear lines, wherein the forward movement of said tear line forming block is done in 1/10 to 1/2 of the filling time, and wherein at the time of the forward movement of said tear line forming block, the molding temperature of the face of the die shaping the outer surface of the molding and opposed to the tear line forming block is higher than that of the tear line forming block.

7. An automobile interior article body manufacturing method according to claim 6, wherein the molding temperature of the face of the die shaping the outer surface of the molding and opposed to the tear line forming block is kept between the thermal deforming temperature (ASTMD64R: 455 k Pa) and the melting temperature till just after the completion of the forward movement of said tear line forming block.

8. An automobile interior article body manufacturing method according to claim 6, wherein the backward movement of said tear line forming block is completed before the opening of the mold.

9. A method for manufacturing an automobile interior article body having a cover portion from which an airbag inflates, wherein said cover portion is molded of a hard resin material integrally with the remaining portions, and wherein a tear line forming block having continuous or discontinuous tear line forming projections corresponding to the tear lines for said cover portion is moved forward within the time period of the molding procedure from just after the start of material filling to the end of filling, and wherein a backward movement of the tear line forming block of said tear line forming projections is done in a plurality of steps.

10. An automobile interior article body manufacturing method according to claim 9, wherein the first and last steps of the backward movement of said tear line forming block are done during the mold continuous pressure period and during the mold cooling time, respectively.

11. An automobile interior article body manufacturing method according to to claim 10, wherein the first and last steps of the backward movement of said tear line forming block are done in 1/10 to 1/2 of the mold continuous pressure period and in 1/2 to 9/10 of the mold cooling time, respectively.

12. An automobile interior article body manufacturing method according to claim 11, wherein the backward movement of said tear line forming block is done in two steps, and wherein the backward stroke of the first step is 1/10 to 1/2 of the whole stroke.

13. An automobile interior article body manufacturing method according to claim 9, wherein the backward movement of said tear line forming block is completed before the opening of the mold.

14. A method for thermally molding a surface portion in an automobile interior article having a cover portion from which an airbag inflates, wherein a surface portion tear line portion of said cover portion is formed simultaneously with said thermal molding, wherein said thermal molding includes a preliminary shaping by a press molding using a male die and a female die and a later final shaping by a vacuum molding simultaneous with the die closing, and wherein said vacuum molding is done in the female die, and at the vacuum suction time of said vacuum molding, a tear line forming blade is moved forward and backward to form said surface portion tear line portion in the rear face of a surface portion material.

15. A method for thermally molding the automobile interior article surface portion according to claim 14, wherein the edge temperature of said tear line forming blade is higher than the melting temperature of the rear side of said surface portion material.

16. An automobile interior article body manufacturing method according to claim 14, wherein the backward movement of said tear line forming block is completed before the opening of the mold.

* * * * *